United States Patent [19]

Ariëns

[11] Patent Number: 4,476,072
[45] Date of Patent: Oct. 9, 1984

[54] PROCESSING MASSES OF SUBSTANTIALLY ORGANIC MATERIAL INTO SHAPED PRODUCTS AND ARTICLES SHAPED ACCORDINGLY

[75] Inventor: Everardus J. Ariëns, Nijmegen, Netherlands

[73] Assignee: Vaessen-Schoemaker Holding B.V., Deventer, Netherlands

[21] Appl. No.: 453,789

[22] Filed: Dec. 27, 1982

[30] Foreign Application Priority Data

Dec. 30, 1981 [NL] Netherlands .................... 8105898

[51] Int. Cl.$^3$ .............................................. B06B 1/00
[52] U.S. Cl. ...................... 264/22; 138/118.1; 264/202; 264/564; 426/234; 426/277
[58] Field of Search ................. 264/22, 202, 557, 564; 426/234, 277; 138/118.1

[56] References Cited

U.S. PATENT DOCUMENTS

| | | | |
|---|---|---|---|
| 3,123,483 | 3/1964 | McKnight | 264/202 |
| 3,408,918 | 11/1968 | Talty et al. | 426/277 |
| 3,523,027 | 8/1970 | Hall | 264/202 |
| 3,579,358 | 5/1971 | Cocerts | 426/277 |
| 3,615,715 | 10/1971 | Mullen | 264/202 |
| 3,681,093 | 8/1972 | Tsuzuki et al. | 264/202 |
| 4,196,223 | 4/1980 | Shank | 264/202 |

*Primary Examiner*—Paul Lieberman
*Assistant Examiner*—W. Thompson
*Attorney, Agent, or Firm*—Albert C. Johnston

[57] ABSTRACT

Shaped articles in thin-walled form, such as threads, membranes, sheets and tubes and particularly material for encasing sausage, are produced from a shapable mass containing in aqueous dispersion at least one coagulable, amphoteric high molecular organic substance, such as collagen or other coagulable animal protein, by extruding the mass through a die into an aqueous bath in which coagulation of such substance in the extrudate is effected by changing the pH of the dispersion so that the isoelectric point of the substance is traversed, the dispersion being prepared with a sufficient content of polyvalent ions, such as calcium ions, to inhibit formation in the extrudate of a barrier to ion penetration. The dispersion desirably also contains an agent for cross-linking the coagulable substance in the extrudate. The mass fed to the extruding die preferably is a collagen paste containing glyoxal and calcium ions. The speed of the coagulation can be enhanced by subjecting the extrudate in the bath to a D.C. electric field.

20 Claims, No Drawings

PROCESSING MASSES OF SUBSTANTIALLY ORGANIC MATERIAL INTO SHAPED PRODUCTS AND ARTICLES SHAPED ACCORDINGLY

The present invention relates to the preparation and shaping of compositions that contain coagulable organic material, so as to form them into shaped products such as threads, yarns, sheets, films, and hollow articles, and particularly also thin-walled cylinders or tubes.

The shaped articles produced according to the invention may find application in many fields, particularly as packaging material, as aids in the medical field, as membranes including permselective membranes, and as color filters. A very large field of their application is for the packaging of foodstuffs, which in most countries is subject to special and sometimes very stringent regulations.

The known films of regenerated cellulose have been useful for many purposes in the foodstuffs industry. Their uses include the packaging of sausage masses, in which case special requirements must be satisfied because of the direct contact between the sausage mass and the sausage casing. Tubular casings of regenerated cellulose have been used for large sausages, such as bolognas, salamis and the like, from which the casing is removed prior to human consumption of the sausage. Regenerated cellulose is also widely used in the preparation of frankfurter sausages, wherein the casing is stuffed with meat emulsion and subsequently is linked, smoked and cooked. The known cellulose films, however, have been unsatisfactory for the packaging of pork sausage, especially in that they do not transmit the fat that is released from the sausage during cooking and, moreover, they are indigestible.

In the past, animal intestines formed a unique packaging for sausages. Since collagen is a major constituent of intestines, later developments were directed to the preparation of collagen films whose properties would closely resemble those of natural intestines. For instance, sausage casings were prepared from films of collagen treated with aluminum salts and subjected to the action of an aldehyde. Because of their indigestibility, however, such casings were found to be of use only if removed to avoid human consumption. Nor did casings prepared from alginates, amylose, or casein turn out to be suitable in the long run.

It is a principal purpose of the present invention, in view of the considerations noted above, to provide shaped articles in the form of films, sheets, or tubes, which are especially beneficial for use as casings or packaging materials in the meat products industry, where the needs for such products are particularly acute. The products of the present invention, however, also lend themselves very well for use in other fields, particularly for medical uses, in the form of films or sheets and also as threads or tapes.

The invention relates also to the preparation of shaped products not only from collagen containing masses but also from masses of other coagulable organic materials, particularly proteins such as casein, alginates and pectins, and, in short, from any of the coagulable amphoteric starting materials which prior to being shaped will form part of an electrolyte containing shapable mass.

The invention is elucidated hereinafter by the description of the shaping of a collagen containing mass which, if desired, can be combined with other materials that are shapable or not.

Collagen itself is prepared from the offal of intestines and, even mainly, from other materials such as skins and tendons and the like animal material. To obtain collagen the animal material is subjected to an extraction treatment by which the collagen is liberated so that in an aqueous medium it will form a doughy mass of paste that can be shaped into threads, sheets, or tubular articles by means of an extruder provided with an appropriate die.

In the past there was a stringent requirement that only non-limed source material be used for the preparation of collagen to be used in sausage casings, and this practice is still preferred by many experts. Subsequently, however, the use of limed source material was permitted, provided that the lime residues were solubilized into a salt which would be thoroughly washed out.

It has heretofore been a practice to prepare shaped products such as sausage casings from a collagen containing mass or paste that, as fed to the extruder, generally contains 2-6% by weight of collagen and has a pH of 2.5-6.5. Extrusion is followed by washing, tanning and drying.

The paste to be extruded may also contain ingredients that serve to improve dimensional stability, practical use, color or other properties of the shaped product or even obviate the need for some after-treatment. For instance, prior to extrusion, cross-linking agents such as glyoxal or other mono- and dialdehydes have been added to the collagen paste. Occasionally also, regenerated cellulose, acrylic esters, polyvinylidene chloride, casein and/or fibers have been incorporated into the collagen paste.

After extrusion through an appropriate die the shaped paste or gel is passed into one or more treatment baths in order to acquire some particularly desired properties, such as dimensional stability. As a rule, use is made of dehydrating or tanning baths, for which purpose it has been proposed to employ highly concentrated solutions of inorganic salts, such as ammonium sulfate or sodium sulfate, alum solutions, solutions of aluminum salts, aldehyde solutions, and ethanol or acetone or other organic solvents.

The hollow cylinders or tubes formed by the extrusion for use as sausage casings are inflated to maintain their shape, as by feeding air into the interior of each casing after closing it at its end.

Shaped collagen products, including sausage casings, have also been obtained by an electrophoresis process. In that process a dilute collagen dispersion is fed into a direct current field established between two electrodes. The electric field causes a collagen containing coating to deposit onto at least one of the electrodes, after which the coating formed is stripped from the electrode. Also, a way has been described for continuously removing the coating from the electrode. In such a process the electrodes constitute the shaping and hence the shape determining elements. It has also been a practice to place an ion-exchanging membrane between the anode and the cathode in such a manner that the particles of the dispersion deposit on the membrane.

The collagen dispersions to be used for forming shaped products by electrolysis have also had components added to them, as used in the art of extrusion, such as cross-linking agents, plasticizers, formalin, alum, fibrous materials, etc. The pH of the dispersions employed typically is about 2-4 or about 10-13, depending on whether deposition on the cathode or on the anode is required.

In the formation of shaped products by electrolysis, major and very troublesome difficulties are encountered in effecting continuous removal of the product from the electrode or the membrane, and in the cleaning of the shaping elements, which is continually required, and as a result of the development of gas at the electrodes and the occurrence of pin holes and other defects in the shaped casing or other product.

The present invention is based on the concept that by an appropriate choice of process parameters the ion transport that causes a dispersion of collagen or other similarly coagulable organic material to form a film may be reduced to a minimum and that in this way an accelerated and enhanced syneresis of the dispersion can be achieved. This is in contrast with the known processes in which a primary objective has been to employ a starting material and processing conditions that will bring about quick dehydration of the extruded product for stiffening it.

According to the present invention, the stiffening for shape retention of an extrudate formed from a dispersion of the collagen or other coagulable organic substance of high molecular weight is brought about by subjecting the extrudate to a change of pH by which the isoelectric point of the coagulable substance is traversed. Thus, when use is made of an acidic dispersion the shaped extrudate formed by passing the dispersion through a die is directed into a bath consisting essentially of a dilute solution of a hydroxide; and when use is made of a basic dispersion the extrudate is directed into a bath consisting essentially of a dilute acid solution. In either case, the coagulable substance in the extrudate is coagulated by a change of pH that changes the state of charge on its particles, with resultant stiffening of the extrudate in its shaped form.

With the process according to the invention the needs for chemicals and the formation of wastes are reduced to a minimum. This process also permits simplifying the after-treatment of the film or other shaped product obtained.

Furthermore, the present process is useful for the preparation of shaped products from a wide variety of shapable masses containing coagulable amphoteric organic material. In this connection mention may be made, for example, of masses containing coagulable proteins that have an amphoteric character, are swellable in water or aqueous liquids and upon comminution are dispersable in water.

According to this invention, after the formation of an extrudable aqueous dispersion or paste containing such a protein, with or without added components, the mass formed is passed through an extruder provided with a shaping die and the resulting extrudate is passed into a coagulation bath having a concentration of hydrogen ions or hydroxyl ions such that it causes the isoelectric point of the protein in the extrudate to be traversed, thus coagulating the protein in the shaped form of the extrudate. The same principle of operation can be applied to any extrudable composition that contains high molecular amphoteric organic material dispersed in an electrolyte containing aqueous medium so that, upon being shaped to thin-walled form and subjected to a sufficient change of pH, the material will undergo a change in its state of charge and assume a non-dispersible form in which it is practically insoluble in an aqueous medium.

The process of the invention is further explained below with reference to collagen.

Collagen pastes having a collagen contact of 2–5% by weight, with the collagen dispersed in an aqueous medium, are known in themselves. In the preparation of these pastes it has been considered necessary heretofore for any calcium ion present to be thoroughly removed. Originally, the only collagen to be processed was prepared from animal skin, but care had to be taken not to use limiting which is a normal pretreatment for instance for removing the hair from skins. Later on, use was also made of limed skins, but only if they had been specially treated to remove the calcium ions.

According to the present invention, however, it is advantageous that a polyvalent ion be present in the collagen dispersion, and it has been found that the calcium ion has a very favorable effect. For the coagulation, however, for instance of normal pastes having a pH of 3, use should be made of an alkaline solution, for example of 0.01–1.0 N, which contains at most small amounts of non-dehydrating salt. Syneresis is promoted by the polyvalent ion contained in the paste, which in this case is a calcium ion. Experiments have demonstrated that the calcium ion when present in the coagulation bath is not capable of replacing the effect of polyvalent ions contained in the paste.

A further increase in the speed of film production can be obtained by incorporating into the acid paste (pH=about 3) a cross-linking agent that is inactive in the paste medium but active during coagulation. Glyoxal has been found to have a particularly favorable effect. The simultaneous presence of glyoxal and calcium ions in the paste has been found to prevent a swelling of the protein that normally takes place at a high pH and inhibits penetration of a dehydrating coagulation agent, thus having a retarding effect.

It has been found further that the application of a direct current electric field transverse to the film immediately upon shaping of the film aids in the formation of a film of good quality, without pin holes, cracks and the like, and enables considerably higher extrudate take-off speeds. The D.C. field increases the rate of penetration of the $OH^-$ ions. In the case of conventional pastes, such an application of an electric field is of no use because it would be attended by the formation of a bipolar membrane that obstructs the hydroxyl ions. This is evident for instance from the fact that the field in such a case causes a considerable increase of the voltage drop across the membrane. The calcium ion in the paste composition as here employed prevents the development of a bipolar membrane that would act as a barrier against flow of the direct electric current.

The extrusion in the present process is preferably carried out in vertically upward direction, the extruder head being provided with a forming die emptying directly into an alkaline bath. The bath, for example, may be a 1.0 N solution of NaOH.

In that manner of carrying out the process, the coagulation speed can be so high that even a slight interruption or technical trouble may cause the die to get clogged and the production process to be discontinued. Although this possibility does not always necessitate corrective steps, it is desirable, and particularly so when the process is speeded up by the use of an electric current, to make some provision to prevent such clogging. It has been found that clogging of the die can be prevented by providing a liquid seal which separates the extruder die from the coagulation liquid. As examples of liquids suitable for the seal may be mentioned: 1,1,1-trichloroethane, mixtures of perchloroethylene and heptane, and chloroform. The liquid of the seal of course must have a specific gravity greater than that of the liquid of the coagulation bath and must not react with it. Even when no electric current is used, this liquid seal introduces a dwell ahead of the coagulation system, thus, for instance, allowing the use of steps such as elongation of the extrudate before the coagulation is effected.

When forming tubular products such as hollow cylinders, the tube formed can be inflated with an air stream during and after the shaping, in a manner known per se, to prevent its inner surfaces from sticking together and to facilitate subjecting it to further treatment. The air may be fed to the inside of the tube through a hollow extruder shaft or in any other convenient way. To this air another gas such as ammonia may be added to effect neutralization at the same time. When a sodium hydroxide bath is maintained on the outside of the formed tube, the bath will also act as a controlled and adequate means of cooling the tube if it is exposed to heat of neutralization. Ammonia gas may, of course, also be used for neutralization both inside and outside the formed tube.

The preparation of a collagen dispersion for use according to the invention may be carried out, for example, as follows:

Salt-cured hides are soaked in water, leached, dehaired with lime and sodium sulfide and washed. Subsequently, the hide is split on both sides to obtain a suitable collagen source, referred to as corium split, for the dispersion to be prepared.

The intermediate split is subjected to a light deliming treatment and then desulfurized by washing with hydrochloric acid in a hide washer, use being made of, for example, 0.02 N hydrochloric acid, 200% moisture on the hides, at a temperature of 20° C. The hides, after being drained, are cut up into approximately square pieces about 5 to 10 cm on a side.

The split is brought to equilibrium by leaving it in contact with dilute acid, which preferably is kept at a constant pH level of 3, for about 2 to 5 days. The contacting time varies with the quality of the hides, the temperature being about 25° C. or lower. The acid used preferably is an inorganic acid such as hydrochloric acid or sulfuric acid.

The resulting conditioned split is roughly ground on a cutter in the presence of hydrochloric acid or sulfuric acid at a pH of 3, after which the material is kneaded, deaerated and pulverized. During these steps the temperature is kept below 30° C. In this way a concentrate is obtained having a collagen content of for example 8–12%.

This strong concentrate is mixed and kneaded in the presence of acid (preferably hydrochloric acid) having a pH of 3, which contains calcium salt and glyoxal in amounts such that the working dispersion contains 0.005 to 0.100 mols of $Ca^{++}$ ions and 0.005 to 0.50% of glyoxal. If desired, this process step may include the incorporation of plasticizers, colorants and other additives. The temperature is kept below 30° C.

The dispersion then is homogenized, for instance with a Manton-Gaulin homogenizer at a pressure drop of 100 bar, and then is passed through a bar filter having 100 microns clearance. The resulting paste is generally resistant to storage longer than 6 months. It may be desirable to allow the paste to mature or some time to enhance its processing properties.

The simultaneous presence of a polyvalent ion, such as calcium ion, and a cross-linking agent, such as glyoxal, leads to surprising advantages.

As a rule, pH values for the collagen of 10 to 11 and higher are avoided, as resultant negative charging can cause swelling of the protein which considerably inhibits dewatering. Moreover, rapid penetration of $OH^-$ ions is hindered at a high pH by the formation of bipolar ion-selective membrane structures, which constitute a barrier against ion penetration.

The use of a cross-linking agent leads to a higher initial strength in the shaped product immediately upon extrusion. In this connection the use of dialdehydes has been found to be especially effective as they are practically inactive in the acid medium of the paste and very rapidly turn active at a pH of about 12.

The polyvalent ion counteracts the formation of an ion selective membrane and inhibits swelling, as a result of which the rate of coagulation is considerably increased.

The practice and principles of the invention are further illustrated in but not limited by the following examples.

EXAMPLE 1

In the manner described hereinbefore four pastes were prepared which are referred to, respectively, as A, B, C and D, which all contained 3% of collagen and were swollen with hydrochloric acid at a pH of 3.

The dispersions differed in respect of added substances as follows:

A no additive;
B 0.05 M of calcium chloride;
C 0.2% by weight of glyoxal;
D 0.05 M of calcium chloride and 0.2% by weight of glyoxal.

The dispersions after thorough mixing were evaluated for their behavior with respect to 0.1 N sodium hydroxide. To 10 g of dispersion there were added 10 ml of the sodium hydroxide, followed by thorough mixing.

The results were as follows:
A strong swelling, transparent, slack;
B less strong swelling, somewhat stringy, less transparent, still not quite firm;
C strong swelling, transparent, firm lumps of gel;
D strong and rapid dewatering, firm and large white flakes.

From these results the following may be concluded:
1. The high pH leads to strong negative charging (paste A).
2. Dewatering, despite the high pH (paste B).
3. Firm, despite the high pH (cross-linking paste C).
4. Both dewatering and cross-linking (paste D).

EXAMPLE 2

Building Up a Barrier

The paste A of Example 1, after being colored with methyl red as indicator, as extruded to form three membranes numbered 1, 2 and 3, which were each supported between polyester gauzes.

The membranes had a wet thickness of 0.7 mm.

The membrane 1 was placed in a bath of dilute lime water having a specific resistance of 700 ohm cm and a pH of about 11. Immediately upon placing the membrane in the bath a constant direct current having a density of 27 mA/cm$^2$ was passed perpendicularly through the membrane. The duration of current passage needed to get a completely penetrated membrane was 130 seconds. During the first 10 seconds the voltage across the membrane increased to 145 V (field strength over 2000 V/cm on average), and then it slowly decreased to 10 V after 100 seconds. After that the current remained constant. The extremely high field strength is due to the building up of a barrier on the membrane.

The experiment was repeated with the membrane 2 under otherwise the same conditions but with an alternating current density at a frequency of 50 cycles per second. The voltage across the membrane remained at a constant value of 5 V. After finishing the experiment there was no sign of neutralization. In the alternating current field there was no build up of a barrier, but neither was there any net OH$^-$ transport.

On membrane 3, the pH of the bath liquid was first decreased by adding hydrochloride acid. The pH of the bath liquid was 5.5. Use was here made again of a direct current having a density of 27 mA/cm$^2$, which was passed through over a period of 130 seconds. On this occasion the voltage across the membrane showed no peak but slowly increased from 10 V to 20 V. After finishing the experiment there was no sign of neutralization. There was no formation of a barrier because no negative structure could be formed: the pH here was kept on the same side of the isoelectric point.

When the experiment were repeated with use of a bath of sodium hydroxide having a pH of 11, the symptoms were identical with those found when use was made of lime water.

These experiments demonstrate that in order to obtain neutralization and prevent the formation of a barrier the calcium ions must be contained in the paste and not in the coagulation bath.

EXAMPLE 3

Pastes having collagen contents of 2, 4 and 6% by weight and containing different amounts of calcium chloride and glyoxal were extruded into a 1.0 N sodium hydroxide bath. The pH of the paste was 3 in all cases. The resulting membranes were evaluated for coherency and strength immediately after coagulation.

The results obtained showed that as far as the collagen content was concerned industrially suitable films could be formed from all three compositions. It was necesary, however, to adapt suitably the two other constituents. The optimum effect was obtained here by use of a paste composition containing 0.1 to 0.2 M of calcium ions and 0.05–0.5% glyoxal. A minimum content of 0.005 M of calcium ions and of 0.02% by weight of glyoxal was found to be required. Upon exceeding the stated upper limits the effect gradually decreased.

EXAMPLE 4

Influence of Direct Current Field

In the experiments of this example the paste was extruded vertically upward into a 1.0 N NaOH bath. Above the point where the extrusion die entered into the NaOH bath a layer of trichloroethane was provided to form a liquid seal. The temperature of the alkaline bath was kept at 20° C. Electrodes spaces apart by a distance of 27 mm were disposed at opposite sides of the extruded film so that, via these electrodes, an electric voltage field could be applied to the film as it was formed.

The strength of the film, or membrane, formed was determined by bombarding it with hydraulic pulses, as follows: Via a metering plunger pump a fixed amount of water was passed through a narrow tubular opening of a No. 3 pulse head. The peak pressure which occurs in the pulsator before the pulse head is a measure of the strength of the hydraulic pulses. Bombarding was done from a point immediately above the surface of the coagulation liquid. The peak pulse pressure found just not high enough to bombard holes into the membrane was used as a test criterion.

Two compositions were tested which each contained 4% by weight of collagen and HCl solution giving the paste a pH value of 3, and which contained additions as follows:

(A) 0.05 M CaCl$_2$ and 0.1% glyoxal;

(B) 0.02 M CaCl$_2$ and 0.2% glyoxal.

The test pulse was set to a peak pressure of 1.2 bar, and subsequently the extrusion speed was determined at which, in the absence of current, no holes were bombarded into the membrane. This take-off speed $v_o$ was 2.5 m/min for composition A and 2.3 m/min for composition B. Next, the take-off speed was increased until a speed v was reached at which holes were bombarded into the membrane.

Voltage was then applied to the electrodes and the current density was increased to a value just not high enough to result in the formation of holes. Then the extrusion speed was again increased and the procedure repeated. The ratio $v/v_o$ is a measure of the increase of extrusion speed obtained by the process. The test results are shown in the following table.

| composition | voltage across membrane (V) | current density (A/cm$^2$) | v:v$_o$ |
| --- | --- | --- | --- |
| A | 0 | 0 | |
| A | n.m. | 0.1 | 1.12 |
| A | n.m. | 0.2 | 1.30 |
| A | 0.7 | 0.3 | 1.46 |
| A | 1.0 | 0.4 | 1.65 |
| B | n.m. | 0.1 | 1.36 |
| B | 1.6 | 0.2 | 1.80 |
| B | 2.2 | 0.3 | 2.30 |
| B | 3.1 | 0.4 | 2.53 | n.m. = not measured.

EXAMPLE 5

Four collagen dispersions of the same composition except as noted below were compared in behavior with respect to three different coagulation media. The respective dispersions contained:

a. no additive;

b. 0.1% glyoxal;

c. 0.1% glyoxal and 0.02 M CaCl$_2$;

d. 0.1% glyoxal and 0.05 M CaCl$_2$.

The following coagulation media were employed in the tests:

1. a 1.0 N NaOH solution;
2. a saturated sodium sulfate solution containing 5% by weight Na$_2$CO$_3$ and 5% by weight of NaHCO$_3$, pH=10 (from the literature);
3. NH$_3$ as gas.

The dispersions which contained no glyoxal and no CaCl$_2$ gave no practically useful results in any of the tests, irrespective of the coagulation media used.

The tests of dispersion b gave only barely acceptable results, and only when using ammonia gas. The results in bath 2 were not acceptable at all.

Dispersions c and d gave good results both with the use of bath 1 and in medium 3. Practically, bath 1 is to be preferred relatively to medium 3.

EXAMPLE 6

Preparation of Artificial Casing

A dispersion containing 4% by weight of collagen, pH=3 (HCl), 0.02 M $CaCl_2$ and 0.1% by weight of glyoxal was extruded to form a tube in a horizontally positioned coagulation bath into which ended a vertically positioned extruder provided with an appropriate die. The extrudate was fed vertically upward into the coagulation bath, which was a 1.0 N NaOH solution. The tube thus formed was neutralized with dilute hydrochloric acid and plasticized in a 2% glycerol solution to which 0.2% of $NaHCO_3$ has been added. After drying, thermal hardening at 80° C. and gradual cooling the tube was acclimatized at 25° C. and 60% relative humidity.

The dry strength of the resulting artificial casing was 32 $N/mm^2$, measured in longitudinal direction, and 26 $N/mm^2$, measured in transverse direction. Dimensions of casing: 34 mm in cross-section, film thickness 53 microns.

EXAMPLE 7

Digestibility of the Casing 10 mg of pepsin were dissolved in a physiological salt solution and was made up to 160 ml with hydrochloric acid of pH 3. A piece weighing 1 g of the casing obtained according to Example 6 was immersed in this pepsin solution. The solution containing the casing was placed in an oven at 37° C. After 7 hours the piece of casing was found to have completely dissolved. It may therefore be concluded that the calcium and glyoxal to be used have no detrimental effect on the digestibility of the artificial casing.

The present invention has been described hereinabove with reference to numerous particulars and detailed examples of ways of practicing it and of resulting products. It is to be understood, however, that the invention can be utilized in various other ways and for the production of various other products, and it is not limited to such particulars and examples except as may be required by fair construction of the appended claims.

I claim:

1. A process for producing shaped thin-walled articles from a shapable mass containing in aqueous dispersion at least one coagulable amphoteric high molecular organic substance such as coagulable animal protein, which comprises extruding the mass through a die that shapes it into the desired thin-walled form, passing the extrude into an aqueous coagulating bath; said dispersion having a pH to one side of the isoelectric point of said substance, and containing sufficient polyvalent ions to inhibit swelling of said substance and formation in the extrudate of an ion-selective barrier against ion penetration; said bath having a pH to the opposite side of said isoelectric point and being substantially free of salt other than at most a small amount of non-dehydrating salt; and in said bath coagulating said substance in the extrudate by effecting a change in the pH of said dispersion such that the isoelectric point of said substance is traversed with a change of the state of charge on the particles thereof.

2. A process according to claim 1, said dispersion being acidic and said bath consisting essentially of a dilute solution of a hydroxide.

3. A process according to claim 1, said dispersion being basic and said bath consisting essentially of a dilute acid solution.

4. A process according to claim 2, said substance comprising collagen and said dispersion also containing a cross-linking agent for the collagen that is inactive in the dispersion per se but is activated in the extrudate by contact with said bath.

5. A process according to claim 4, said cross-linking agent being a dialdehyde.

6. A process for producing shaped thin-walled articles from a shapable mass containing in aqueous dispersion at least one coagulable amphoteric high molecular organic substance such as coagulable animal protein, which comprises extruding the mass through a die that shapes it into the desired thin-walled form, and in said bath coagulating said substance in the extrudate by effecting a change in the pH of said dispersion such that the isoelectric point of said substance is traversed, said dispersion containing sufficient polyvalent ions to inhibit formation in the extrudate of a barrier against ion penetration; said dispersion being acidic and said bath consisting essentially of a dilute solution of a hydroxide; said substance comprising collagen and said dispersion also containing a cross-linking agent for the collagen that is inactive in the dispersion per se but is activated in the extrudate by contact with said bath; said cross-linking agent being glyoxal.

7. A process according to claim 4, said polyvalent ions being calcium ions.

8. A process for producing shaped thin-walled articles from a shapable mass containing in aqueous dispersion at least one coagulable amphoteric high molecular organic substance such as coagulable animal protein, which comprises extruding the mass through a die that shapes it into the desired thin-walled form, passing the extrude into an aqueous coagulating bath; and in said bath coagulating said substance in the extrudate by effecting a change in the pH of said dispersion such that the isoelectric point of said substance is traversed, said dispersion containing sufficient polyvalent ions to inhibit formation in the extrudate of a barrier against ion penetration, said dispersion being acidic and said bath consisting essentially of a dilute solution of a hydroxide, said substance comprising collagen and said dispersion containing about 0.01–0.2 mols of calcium ion per liter and about 0.05–0.5% by weight of glyoxal.

9. A process according to claim 2, or 8, said bath being an alkaline solution containing about 0.01 to about 1.0 mol of NaOH per liter.

10. A process according to claim 1, 2, 3, 4, 7, or 8, said extrudate being passed vertically upward from said die into said bath.

11. A process according to claim 10, and keeping said bath separate from said die by a layer of a liquid that is inert both to the bath and to the extrudate and is imiscible with and of higher specific gravity than the liquid of said bath.

12. A process according to claim 1, 2, 3, 4, 7, or 8, and subjecting the extrudate in said bath to a D.C. electric field applied transverse to the wall of the extrudate.

13. A process for producing sausage casings or like tubular products, which comprises forming a shapable acidic collagen paste containing about 2 to 6% by weight of collagen, about 0.01 to 0.2 mols of calcium ion per liter and about 0.05 to 0.5% by weight of glyoxal; extruding said paste through a die that shapes it into a thin-walled seamless tubular form; passing the extrudate from said die into a bath consisting essentially of a dilute aqueous solution of a hydroxide; and by the action of said bath effecting a change in the pH of the extrudate sufficient to change the state of charge on the particles thereof and cause reaction of the glyoxal therein, so as to coagulate and cross-link the collagen in the extrudate.

14. A process according to claim 13, said extrudate being passed vertically upward from said die into said bath.

15. A process according to claim 14, and as the extrudate is being formed and passed into said bath introducing a gas stream inside its tubular wall to keep it inflated and exposed both inside and outside to coagulating action.

16. A process according to claim 15, said gas stream containing ammonia for neutralizing the extrudate.

17. A process according to claim 13, 14, 15, or 16, and subjecting the extrudate in said bath to a D.c. electric field applied transverse to the wall of the extrudate.

18. Shaped thin-walled articles such as threads, membranes, sheets, or tubes, formed as extrudates of an aqueous dispersion containing and having coagulated therein in situ at least one amphoteric high molecular organic substance such as amphoteric animal protein, as produced by a process according to claim 1, 2, 3, 4, 7, or 8.

19. Shaped tubular articles suited for use as sausage casings, formed as extrudates of a collagen paste having the collagen therein coagulated in situ, as prepared by a process according to claim 1, 2, 3, 4,7,8, 13, 14, 15, 16, or 17.

20. Shaped tubular articles suited for use as sausage casings, formed as extrudates of a collagen paste containing calcium ions and glyoxal and having the collagen therein coagulated and cross-linked in situ.

* * * * *